United States Patent [19]
White

[11] Patent Number: 5,328,783
[45] Date of Patent: Jul. 12, 1994

[54] ELECTRIC CELLS WITH SELF-SUPPORTING POROUS CERAMIC PLATE

[75] Inventor: Philip J. White, Stoke-on-Trent, England

[73] Assignee: Portmeirion Potteries Limited, United Kingdom

[21] Appl. No.: 927,622

[22] PCT Filed: Feb. 22, 1991

[86] PCT No.: PCT/GB91/00280
§ 371 Date: Sep. 21, 1992
§ 102(e) Date: Sep. 21, 1992

[87] PCT Pub. No.: WO91/13471
PCT Pub. Date: Sep. 5, 1991

[30] Foreign Application Priority Data
Feb. 24, 1990 [GB] United Kingdom ............... 9004224

[51] Int. Cl.⁵ .............................................. H01M 4/72
[52] U.S. Cl. .................................. 429/233; 429/160; 429/161
[58] Field of Search .................... 429/160, 161, 233

[56] References Cited
U.S. PATENT DOCUMENTS 3,379,569  4/1968  Beyer et al. ............... 429/206
4,400,447  8/1983  Gerenser et al. ........... 429/27

Primary Examiner—Prince Willis, Jr.
Assistant Examiner—M. Nuzzolillo
Attorney, Agent, or Firm—W. Thad Adams, III

[57] ABSTRACT

An electric cell 10 comprising a ceramic porous plate 12 which has previously been soaked in sulphuric acid such that a substantial volume of the pores contain sulphuric acid. Spaces are provided on either side of the plate 12 by a casing 14. The spaces are respectively filled, one with powdered lead-oxide 16, and the other with lead powder 18. Strips of lead 20, 22 extend from adjacent the base of the casing 14 through respectively the lead oxide 16 and the lead powder 18 and through an upper removable cap 24 of the casing 14 to provide terminals 26, 28.

19 Claims, 2 Drawing Sheets

ELECTRIC CELLS WITH SELF-SUPPORTING POROUS CERAMIC PLATE

This application is a PCT application.

This invention concerns improvements in or relating to electric cells and particularly but not exclusively lead-acid accumulators.

Lead-acid accumulators are commonly used, and particularly in motor vehicles, to take advantage of the high current which can be obtained from them. However, a number of disadvantages are experienced with such accumulators. These accumulators contain liquid sulphuric acid and thus hazardous spillage may occur, particularly in the occurrence of an accident such as the accumulator being dropped or a road accident. For this reason in certain situations such as on board ships, lead-acid accumulators are often not permitted. Further such accumulators are relatively bulky and particularly heavy thus making transportation difficult. This is of particular relevance in for instance mines where miners may carry such accumulators to power their head lamps. Furthermore if a lead accumulator is overcharged, gaseous hydrogen and oxygen may be given off and thus a system of venting is required which further increases the likelihood of acid spillage. The relative weight of such accumulators reduces their effective use in electrically powered vehicles.

According to the present invention there is provided an electric cell comprising a self supporting porous member in which a liquid electrolyte is absorbed, and means for locating a first material in contact with the member to constitute the anode and a second material in contact with the member to constitute the cathode.

The porous member is preferably substantially rigid.

Preferably the first and second materials are respectively in contact with opposite sides of the member.

Electrical conductors preferably extend through the cell in contact respectively with either the first or second materials. The conductors may be provided on the porous member and may be printed thereon and may comprise printed gold.

Additional electrical conductors preferably extend from the conductors in contact with the first and second materials, externally of the cell to provide terminals for the cell.

The porous member is preferably made of a ceramic material.

The porous member desirably has a substantially planar configuration and the exterior of the porous member may be contoured.

The first and second materials may be particulate and held in closed spaces against respective sides of the porous member.

Alternatively the first and second materials may be applied as a coating to the respective sides of the porous member. The coating may be applied to the porous member by rolling or pointing.

The electrolyte may be sulphuric acid and the first and second materials respectively lead oxide and lead.

The invention also provides an accumulator comprising a plurality of connected cells adjacent each other of the type described in any of the preceding ten paragraphs. The cells preferably have respective alternate common first and second materials. The accumulator may be of the lead-acid type.

A protective coating is preferably provided around the cell or cells and this may be formed by dipping the cell or cells in a liquid rubber or plastics material to provide a durable coating.

Embodiments of the present invention will now be described by way of example only with reference to the accompanying drawings in which.

Figure 1:
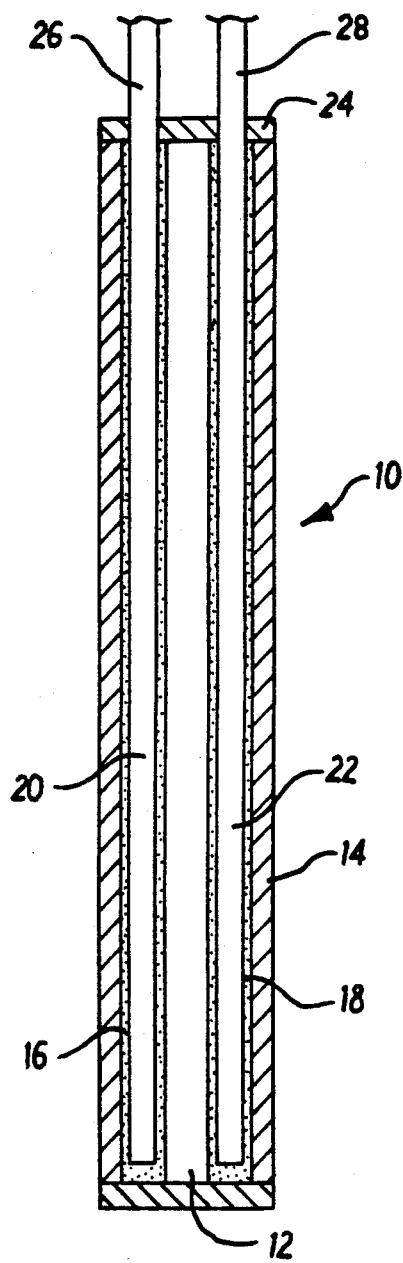
FIG. 1 is a diagrammatic cross-sectional side view through a cell according to the present invention.

FIG. 1 shows a cell 10 suitable for use in combination with other such cells in for example a battery for a motor vehicle. The cell 10 comprises a plate 12 of porous ceramic material. The ceramic material of the plate 12 is porous and the plate 12 has been previously soaked in sulphuric acid such that a substantial volume of the pores contains sulphuric acid.

The plate 12 is mounted centrally within a rectangular casing 14 which may be made for example of a plastics material. The casing 14 is arranged such that spaces are provided on either side of the plate 12. One of these spaces is filled with powdered lead oxide 16 and the other with lead powder 18. Strips of lead 20,22 extend from adjacent the base of the casing through respectively the lead oxide 16 and the lead powder 18 and through an upper removable cap 24 of the casing 14 to provide terminals 26,28.

In use, the lead oxide 16 constitutes the anode and the lead powder 18 constitutes the cathode and respective connections thereto are provided by the terminals 26,28. Six such cells would be connected together to form a conventional twelve volt battery.

In test after charging for a number of hours the above described cell has produced a voltage of at least two volts, yet this cell has a weight in the order of half that of a conventional cell comprising lead plates in an acid bath. This cell is considerably safer than a conventional cell in that a spillage of acid will not occur therefrom even in the event of the cell being damaged. The construction of this cell is likely to be more durable than conventional cell. The cell may be readily and thus inexpensively manufactured.

The rigidity of the cell is provided by the ceramic plate and not the active material (lead/lead oxide) and thus no excess active material is required in the cell resulting in the reduced weight. A common cause of failure of conventional lead acid accumulators is flaking or shredding of the active plates which will not occur with cells according to the invention.

Figure 2:
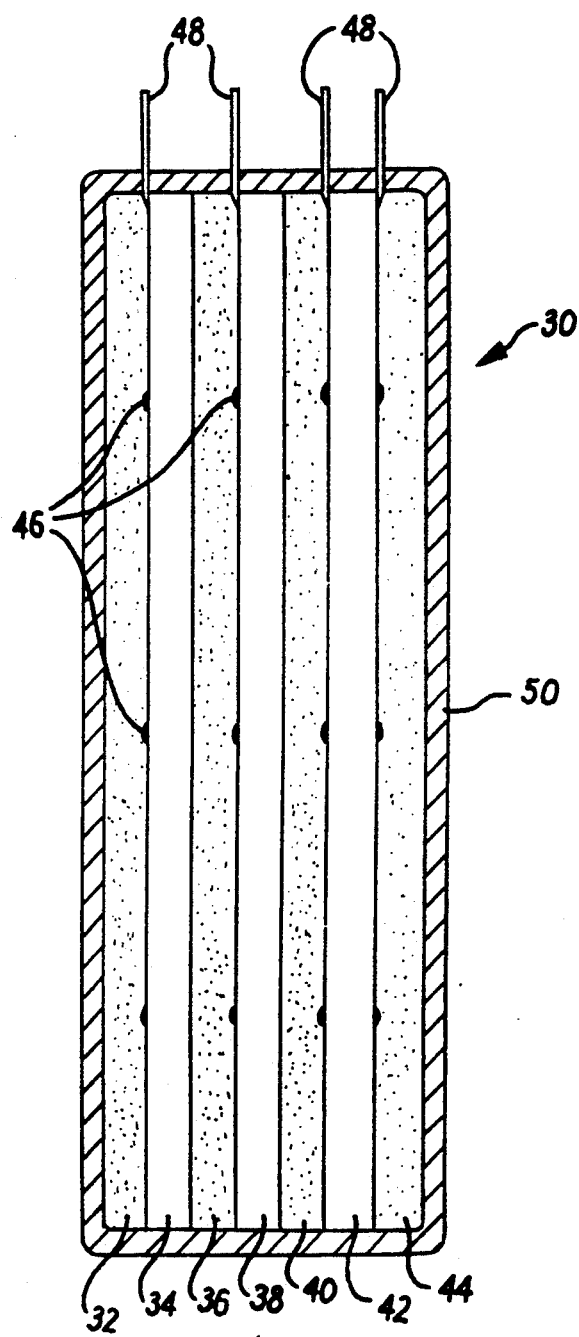
FIG. 2 is a similar view of an accumulator comprising a plurality of further cells according to the present invention.
Figure 3:
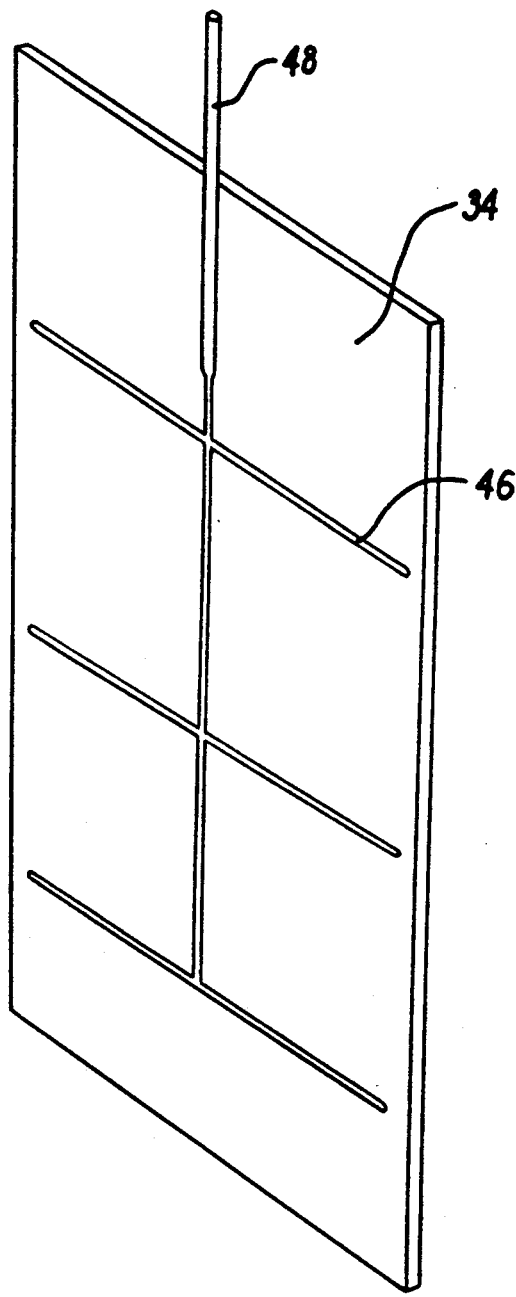
FIG. 3 is a respective view of part of the accumulator of FIG. 2.

FIGS. 2 and 3 show a three cell accumulator 30. The accumulator 30 has a sandwich configuration with layers (from left to right in FIG. 2) of lead oxide 32, a first ceramic plate 34 which has been soaked in sulphuric acid, a layer of lead 36, a second ceramic plate 38, a further layer of lead oxide 40, a third ceramic plate 42, and a further layer of lead 44. The layers of lead oxide and lead 32, 40, 36, 44 are formed on the ceramic plates 34, 38, 42 by rolling. The lead or lead oxide is mixed with a medium, which may be a rubber compound to form a flexible mixture which is rolled onto a ceramic plate. The coated plate is then sintered to burn off the organic material. The above described sandwich configuration may be sintered as a whole. Alternatively the medium may be such that the organic material will evaporate away of it volition.

A network 46 (FIG. 3) of a conducting material such as gold is printed on the left hand side of the ceramic plates 34 and 38 and both sides of the ceramic plate 44. The networks 46 are provided to ensure electrical connectivity between the active materials and the electrolyte in the plates 34, 38, 42. Connected to each of the networks 46 is a strip 48 of a further conducting material which extends upwardly to provide terminals. The strips 48 on the plate 38 and the left hand side of the plate 42 each provide a common terminal for two cells with the other strips 48 providing a terminal for just one cell. The sandwich configuration is enclosed within a plastic casing 50 with the strips 48 extending therethrough. The casing 50 is formed by dipping the configuration in a bath of a liquid plastics material.

Various other modifications may be made without departing from the scope of the invention. For example the lead and lead oxide may be coated on the ceramic plate by for example painting. A rubber protective coating could be provided by dipping. Many different materials other than ceramic could be used for the plate. The requirement for the plate material being that it is sufficiently porous and inert to the electrolyte. The apparatus may obviously be used for cells other than lead-acid cells. The use of a porous member soaked with electrolyte could also be used in primary cells and also in electroplating. The plate may be differently shaped and its exterior may be contoured thereby providing a greater surface area for contact between the porous member and the materials either side thereof.

I claim:

1. An electric cell comprising a self supporting porous member in which a liquid electrolyte is absorbed; a first material comprising an anode in contact with the member; a second material comprising a cathode in contact with the member; and electrical conductors positioned on the porous member and extending through the cell in contact respectively with either the first or second materials.

2. An electric cell according to claim 1, wherein the porous member is substantially rigid.

3. An electric cell according to claims 1 or 2, wherein the first and second materials are respectively in contact with opposite sides of the member.

4. An electric cell according to claim 3, wherein the first and second materials are particulate and held in closed spaces against respective sides of the porous member.

5. An electric cell according to claim 3, wherein the first and second materials are applied as a coating to the respective sides of the porous member.

6. An electric cell according to claim 5, wherein the first and second materials are in the form of a rolled coating.

7. An electric cell according to claim 5, wherein the first and second materials are in the form of a painted coating.

8. An electrical cell according to claim 1, wherein the electrolyte is sulfuric acid and the first and second materials respectively are lead oxide and lead.

9. An electric cell according to claim 1, wherein the porous member is made of a ceramic material.

10. An electric cell according to claim 1, wherein the porous member has a substantially planar configuration.

11. An electric cell according to claim 1, wherein the porous member has a contoured exteruir, 12. An electric cell according to claim 1, wherein the conductors are printed on the porous member.

13. An electric cell according to claim 2, wherein the printed conductors comprise gold.

14. An electric cell according to claim 1, wherein additional electrical conductors extend from the conductors in contact with the first and second materials, externally of the cell to provide terminals for the cell.

15. An accumulator comprising a plurality of connected electric cells according to claim 1 positioned adjacent to each other.

16. An accumulator according to claim 15, wherein the cells have respective alternate common first and second materials.

17. An accumulator according to claim 16, wherein that the accumulator is of the lead-acid type.

18. An accumulator according to claim 15, wherein a protective coating is provided around the electric cell.

19. A method of coating electric cells in an accumulator, comprising the step of dipping the cell in a liquid rubber or plastics material.

* * * * *